(12) United States Patent
Yao et al.

(10) Patent No.: US 8,830,431 B2
(45) Date of Patent: Sep. 9, 2014

(54) PIXEL ELECTRODE AND LCD DEVICE

(75) Inventors: Xiaohui Yao, Guandong (CN); Je-Hao Hsu, Guandong (CN); Shyh-Feng Chen, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 111 days.

(21) Appl. No.: 13/641,111

(22) PCT Filed: Jul. 18, 2012

(86) PCT No.: PCT/CN2012/078818
§ 371 (c)(1),
(2), (4) Date: Oct. 13, 2012

(87) PCT Pub. No.: WO2014/012229
PCT Pub. Date: Jan. 23, 2014

(65) Prior Publication Data
US 2014/0016073 A1    Jan. 16, 2014

(30) Foreign Application Priority Data
Jul. 16, 2012   (CN) .......................... 2012 1 0245468

(51) Int. Cl.
*G02F 1/1343*   (2006.01)
(52) U.S. Cl.
USPC .............. 349/139; 349/43; 349/129; 349/123
(58) Field of Classification Search
CPC ............... G02F 1/134309; G02F 2001/134318
USPC ........................................................ 349/139
See application file for complete search history.

(56) References Cited

U.S. PATENT DOCUMENTS

| | | | |
|---|---|---|---|
| 7,656,474 B2* | 2/2010 | Hanaoka et al. | 349/100 |
| 2003/0086044 A1* | 5/2003 | Inoue et al. | 349/141 |
| 2007/0285608 A1* | 12/2007 | Fan et al. | 349/155 |
| 2008/0297707 A1* | 12/2008 | Yang et al. | 349/124 |
| 2011/0025970 A1* | 2/2011 | Hashimoto et al. | 349/139 |
| 2011/0075087 A1* | 3/2011 | Morinaga et al. | 349/143 |
| 2012/0154703 A1* | 6/2012 | Yoshida et al. | 349/43 |
| 2012/0307172 A1* | 12/2012 | Yoshida | 349/43 |
| 2013/0021570 A1* | 1/2013 | Zhang | 349/139 |

FOREIGN PATENT DOCUMENTS

CN   102540585   *   7/2012   ........... G02F 1/1343

* cited by examiner

*Primary Examiner* — Edward Glick
*Assistant Examiner* — Sang V Nguyen
(74) *Attorney, Agent, or Firm* — Andrew C. Cheng

(57) ABSTRACT

The present invention provides a pixel electrode structure and a LCD device. The pixel electrode contains linear backbone electrodes, a first backbone electrode and a second backbone electrode, whose centers cross each other, thereby forming four display regions. Each display region is configured with a number of linear spine electrodes at intervals, and the edges of the outer ends of the spine electrodes in the same display are aligned. Yet, the edges of the outer ends of the backbone electrodes are not aligned with those of the spine electrodes. Through the present invention, the display quality at the outer ends of the backbone electrodes is enhanced.

10 Claims, 5 Drawing Sheets

PIXEL ELECTRODE AND LCD DEVICE

BACKGROUND OF THE INVENTION

1. Field of the Invention

The present invention relates to the field of liquid crystal displaying techniques, and in particular to a structure of pixel electrode and a related liquid crystal display device.

2. The Related Arts

LCD (liquid crystal display) device is one of the most widely applied flat panel display devices. There are various techniques for showing images on a LCD device, such as TN (twisted nematic), IPS (in plane switching) and VA (vertical alignment) techniques.

HVA is one types of the VA technique. It adopts photo-alignment and applying voltage to form a liquid crystal layer on the PI layer having a specific slant angle to replace the conventional rubbed alignment.

To achieve a wide viewing angle, the HVA technique adopts a multi-domain pixel electrode structure. FIG. 1 is a schematic diagram showing a conventional pixel electrode structure 100 according to the HVA technique. As shown in FIG. 1, a backbone electrode 101 is configured vertically, another backbone electrode 102 is configured laterally, and the centers of the backbone electrodes 101 and 102 cross each other perpendicularly, so as to form four display regions 11, 12, 13, and 14. Within each display regions, there are multiple spine electrodes at intervals such as the spine electrodes 111, 121, 131, and 141 shown in FIG. 1. The backbone electrodes 101 and 102, and the spine electrodes 111, 121, 131, and 141 all have their outer ends aligned with each other.

However there are differences between the field patterns of the electrical fields at the outer ends of the backbone electrodes 101 and 102, and the spine electrodes 111, 121, 131, and 141, thereby causing the orientation of the liquid crystal molecules at the outer ends of the backbone electrodes 101 and 102 to be disorderly, resulting disclination, and affecting the display quality and transmittance at the outer ends of the backbone electrodes.

SUMMARY OF THE INVENTION

The technical issue to be addressed by the present invention is to provide a pixel electrode structure and a related LCD device where the pixel electrode is capable of enhancing the display quality at the outer ends of the backbone electrodes, thereby enhancing the display quality of the LCD device.

To address the technical issue, the present invention provides a pixel electrode structure having at least a linear first backbone electrode and a linear second backbone electrode, where the centers of the first and second backbone electrodes cross each other perpendicularly, thereby forming four display regions; each display region is configured with a plurality of linear spine electrodes at intervals; the edges of the spine electrodes' outer ends in a same display region are aligned; and the edges of the backbone electrodes' outer ends are not aligned with the edges of the spine electrodes' outer ends by having the backbone electrodes' outer ends extended outward or indented inward relative to the outer ends of the spine electrodes, Preferably, at least an outer end of a backbone electrode is extended outward to form a trapezoid-shaped auxiliary electrode having two side edges connected to the backbone electrode; a first side edge is parallel to the spine electrodes in a same display region as the first side edge; and a second side edge is parallel to the spine electrodes in a same display region as the second side edge.

To address the technical issue, the present invention provides another pixel electrode structure having at least a linear first backbone electrode and a linear second backbone electrode, where the centers of the first and second backbone electrodes cross each other perpendicularly, thereby forming four display regions; each display region is configured with a plurality of linear spine electrodes at intervals; the edges of the spine electrodes' outer ends in a same display region are aligned; and the edges of the backbone electrodes' outer ends are not aligned with the edges of the spine electrodes' outer ends.

Preferably, at least an outer end of a backbone electrode is extended outward relative to the outer ends of the spine electrodes.

Preferably, the overshoot section of the outwardly extended outer end forms a linear auxiliary electrode; and the auxiliary electrode is extended along the direction of the backbone electrode.

Preferably, the width of the auxiliary electrode is identical to that of the backbone electrode.

Preferably, the overshoot section of the outwardly extended outer end forms a pair of linear auxiliary electrodes; a first auxiliary electrode is parallel to the spine electrodes in a same display region as the first auxiliary electrode; and a second auxiliary electrode is parallel to the spine electrodes in a same display region as the second side edge.

Preferably, the overshoot section of the outwardly extended outer end forms a trapezoid-shaped auxiliary electrode; the trapezoid-shaped auxiliary electrode has two side edges connected to the backbone electrode; a first side edge is parallel to the spine electrodes in a same display region as the first side edge; and a second side edge is parallel to the spine electrodes in a same display region as the second side edge.

Preferably, at least an outer end of a backbone electrode is indented inward relative to the outer ends of the spine electrodes.

Preferably, the indentation of the inwardly indented outer end has a trapezoid shape.

Preferably, the indentation of the inwardly indented outer end has a triangle shape.

To address the technical issue, the present invention also provides a LCD device having at least a pixel electrode structure having at least a linear first backbone electrode and a linear second backbone electrode, where the centers of the first and second backbone electrodes cross each other perpendicularly, thereby forming four display regions; each display region is configured with a plurality of linear spine electrodes at intervals; the edges of the spine electrodes' outer ends in a same display region are aligned; and the edges of the backbone electrodes' outer ends are not aligned with the edges of the spine electrodes' outer ends.

Preferably, at least an outer end of a backbone electrode is extended outward relative to the outer ends of the spine electrodes.

Preferably, the overshoot section of the outwardly extended outer end forms a linear auxiliary electrode; and the auxiliary electrode is extended along the direction of the backbone electrode.

Preferably, the width of the auxiliary electrode is identical to that of the backbone electrode.

Preferably, the overshoot section of the outwardly extended outer end forms a pair of linear auxiliary electrodes; a first auxiliary electrode is parallel to the spine electrodes in a same display region as the first auxiliary electrode; and a second auxiliary electrode is parallel to the spine electrodes in a same display region as the second side edge.

Preferably, the overshoot section of the outwardly extended outer end forms a trapezoid-shaped auxiliary electrode; the trapezoid-shaped auxiliary electrode has two side edges connected to the backbone electrode; a first side edge is parallel to the spine electrodes in a same display region as the first side edge; and a second side edge is parallel to the spine electrodes in a same display region as the second side edge.

Preferably, at least an outer end of a backbone electrode is indented inward relative to the outer ends of the spine electrodes.

Preferably, the indentation of the inwardly indented outer end has a trapezoid shape.

Preferably, indentation of the inwardly indented outer end has a triangle shape.

The advantage of the present invention is as follows. By having the edges of the backbone electrodes' outer ends not aligned with the edges of the spine electrodes' outer ends, the field pattern differences between those around the outer ends of the backbone electrodes and those of the spine electrode are reduced. The liquid crystal molecules at the outer ends of the backbone electrodes as such are oriented properly, thereby enhancing the display quality at the outer ends of the backbone electrodes, as well as the display quality of the LCD device.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
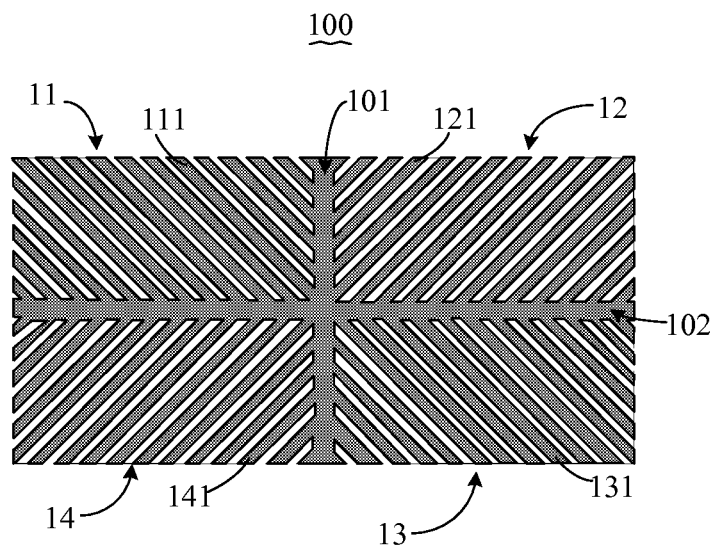
FIG. 1 is a schematic diagram showing the structure of a conventional pixel electrode according to the HVA technique.
Figure 2:
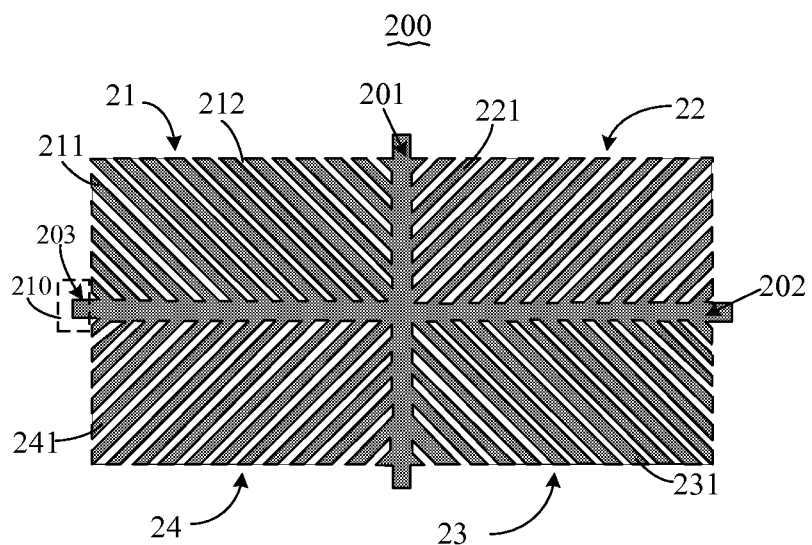
FIG. 2 is a schematic diagram showing a pixel electrode structure according to a first embodiment of the present invention.

Together with the accompanied drawings, detailed description to the embodiments of the present invention is provided as follows FIG. 2 is a schematic diagram showing a pixel electrode structure according to a first embodiment of the present invention. As illustrated, the pixel electrode structure 200 contains two linear backbone electrodes: a first backbone electrode 201 and a second backbone electrode 202.

In the present embodiment, the first backbone electrode 201 is configured vertically, the second backbone electrode 202 is configured laterally, and the centers of the first and second backbone electrodes 201 and 202 cross each other perpendicularly, thereby forming four display regions 21, 22, 23, and 24. Within each of the four display regions 21, 22, 23, and 24, there are multiple linear spine electrodes. The spine electrodes all have their outer ends aligned with each other. However, the backbone electrodes have their outer ends not aligned with those of the spine electrodes.

More specifically, using the display region 21 as example, there are multiple linear spine electrodes 211. A slit 212 is reversed between two adjacent spine electrodes 211. The spine electrodes 211 and the slits 212 are parallel to each other. An inner end of each spine electrode 211 is connected to the first or second backbone electrodes 201 or 202. The outer ends of the spine electrodes 211 are extended towards the outside of the display region 21. The spine electrodes 211 all have their outer ends aligned with each other.

Similarly, there are spine electrodes 221, 231, and 241 in the display regions 22, 23, and 24, respectively, and their configurations are identical to that of the spine electrodes 211 in the display region 21. The details are omitted here, As described, the first and second backbone electrodes 201 and 202, and the spine electrodes 211, 221, 231, and 241 jointly form an asterisk-like pattern. In this pattern, the backbone electrodes have their outer ends not aligned with those of the spine electrodes so as to reduce the differences in the electrical field patterns at the outer ends of the backbone and spine electrodes.

More specifically, using an outer end 203 of the second backbone electrode 202 as example, it is extended beyond the vertical alignment of the spine electrodes 211 and 241. The overshoot section is an auxiliary electrode 210 that extends along the direction of the second backbone electrode 202. In the present embodiment, the width of the auxiliary electrode 210 is identical to that of the second backbone electrode 202.

The two outer ends of the first backbone electrode 201 and the other outer end of the second backbone electrode 202 are configured identically to the outer end 203 of the second backbone electrode 202. The details are therefore are omitted here.

In the present embodiment, the auxiliary electrodes that extends from a backbone electrode causes the edges of the backbone electrodes' outer ends are not aligned with the edges of the spine electrodes' outer ends. The field pattern differences between those around the outer ends of the backbone electrodes and those of the spine electrode are reduced. The liquid crystal molecules at the outer ends of the backbone electrodes as such are oriented properly, thereby enhancing the display quality at the outer ends of the backbone electrodes. The specific effect can be seen from FIG. 3.

Figure 3:
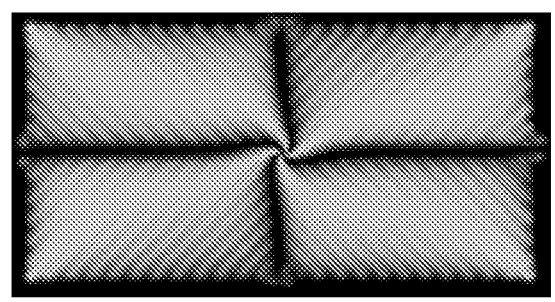
FIG. 3 shows the effect of a pixel electrode structure according to a first embodiment of the present invention.
Figure 4:
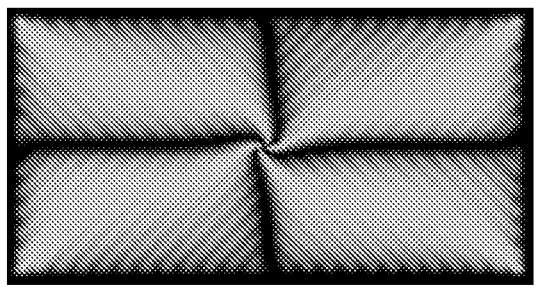
FIG. 4 shows the effect of a conventional pixel electrode structure.

FIG. 3 shows the effect of a pixel electrode structure according to a first embodiment of the present invention. FIG. 4 shows the effect of a conventional pixel electrode structure. As illustrated in FIG. 3, there are four display regions b the pixel electrode structure 200, each separated by the "black regions" corresponding to the backbone electrodes. Both the first and second backbone electrodes 201 and 202 have their outer ends extended outward, and each outer end achieves two bulged display regions separated by the "black region" corresponding to the backbone electrode. As illustrated in FIG. 4, the outer ends of the conventional first backbone electrode 101 and second backbone electrode 102 all have "black regions" at their outer ends. The display effect shown in FIG. 3 indicates that the display quality at the outer ends of the backbone electrodes is obviously improved.

Figure 5:
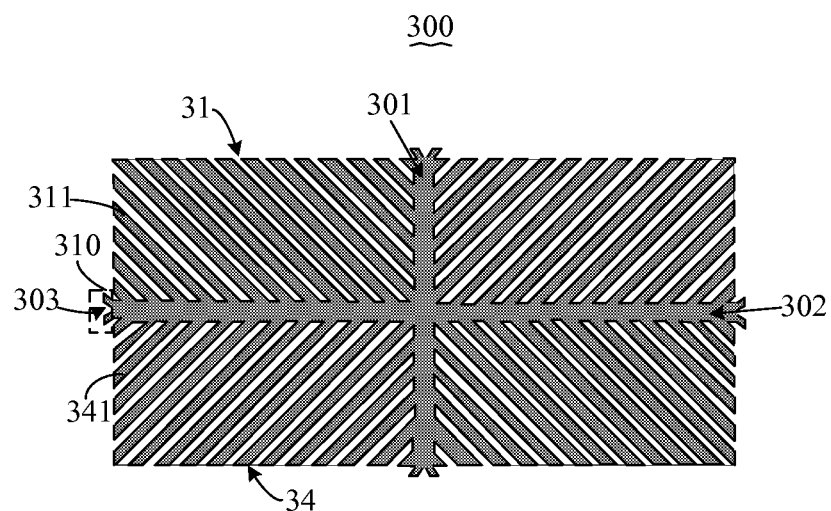
FIG. 5 is a schematic diagram showing a pixel electrode structure according to a second embodiment of the present invention.

FIG. 5 is a schematic diagram showing a pixel electrode structure 300 according to a second embodiment of the present invention. As illustrated, the pixel electrode structure 300 also has an asterisk-like pattern. The difference between the present embodiment and the pixel electrode structure 200 of FIG. 2 is that each auxiliary electrode has a pair of linear auxiliary spine electrodes.

More specifically, using the second backbone electrode 302 as example, one of its outer ends 303 is extended outward to form an auxiliary electrode 310 having a pair of linear auxiliary spine electrodes. One of the auxiliary spine electrodes is parallel to a spine electrode 311 in the same display region 31 whereas the other auxiliary spine electrode is parallel to a spine electrode 341 in the same display region 34. Each auxiliary spine electrode is smaller than any spine electrode in the same display region.

The two outer ends of the first backbone electrode 301 and the other outer end of the second backbone electrode 302 are configured identically to the outer end 303 of the second backbone electrode 302 The details are therefore are omitted here.

The auxiliary spine electrodes also enhance the display quality at the outer ends of the backbone electrodes as described earlier and the effect is illustrated in FIG. 6.

Figure 6:
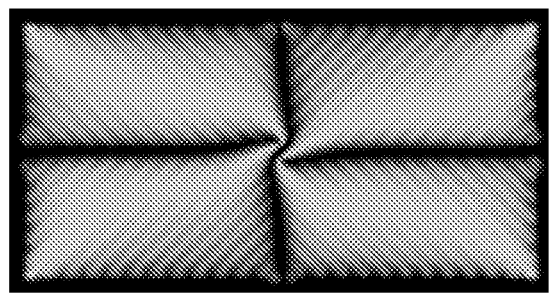
FIG. 6 shows the effect of a pixel electrode structure according to a second embodiment of the present invention.

FIG. 6 shows the effect of the pixel electrode structure according to the second embodiment of the present invention. As illustrated, both the first and second backbone electrodes 301 and 302 have their outer ends extended outward, and each outer end achieves two bulged display regions separated by the "black region" corresponding to the backbone electrode. As illustrated in FIG. 4, the outer ends of the conventional first backbone electrode 101 and second backbone electrode 102 all have "black regions" at their outer ends. The display effect shown in FIG. 6 indicates that the display quality at the outer ends of the backbone electrodes is obviously improved.

Figure 7:
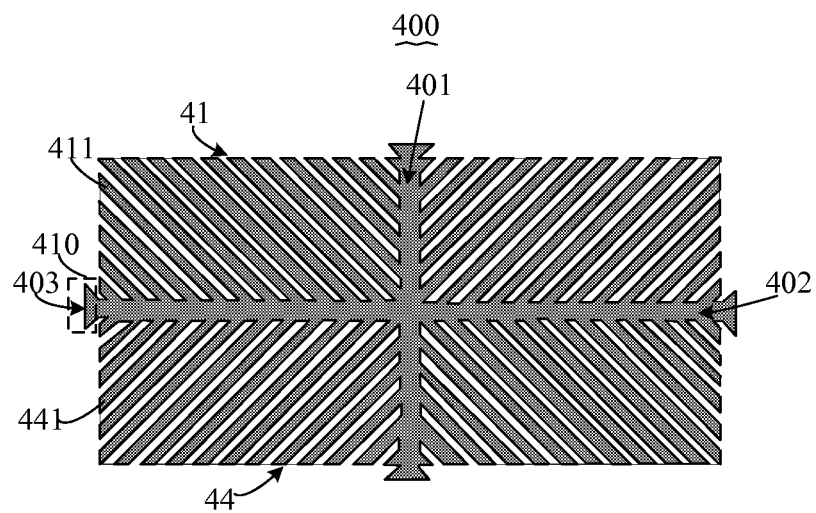
FIG. 7 is a schematic diagram showing a pixel electrode structure according to a third embodiment of the present invention.

FIG. 7 is a schematic diagram showing a pixel electrode structure 400 according to a third embodiment of the present invention. As illustrated, the pixel electrode structure 400 also has an asterisk-like pattern. The difference between the present embodiment and the pixel electrode structure 200 of FIG. 2 is that each auxiliary electrode has a trapezoid shape.

More specifically, using the second backbone electrode 302 as example, one of its outer ends 403 is extended outward to form a trapezoid-shaped auxiliary electrode 410 having its two side edges connected to the second backbone electrode 402. One of the side edges is parallel to a spine electrode 411 in the display region 41 whereas the other side edge is parallel to a spine electrode 441 in the display region 44. Preferably, the width of a top edge of the trapezoid-shaped auxiliary electrode 410 is identical to that of the second backbone electrode 402.

The two outer ends of the first backbone electrode 401 and the other outer end of the second backbone electrode 402 are configured identically to the outer end 403 of the second backbone electrode 402 The details are therefore are omitted here.

The trapezoid-shaped auxiliary electrodes also enhance the display quality at the outer ends of the backbone electrodes as described earlier and the effect is illustrated in FIG. 8.

Figure 8:
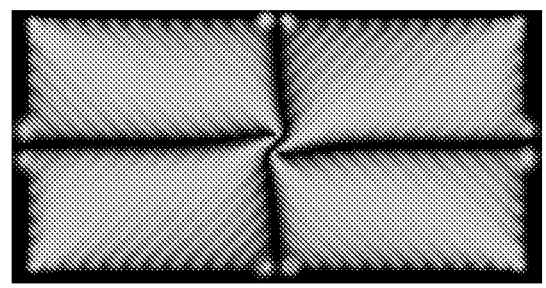
FIG. 8 shows the effect of a pixel electrode structure according to a third embodiment of the present invention.

FIG. 8 shows the effect of the pixel electrode structure according to the third embodiment of the present invention. As illustrated, both the first and second backbone electrodes 401 and 402 have their outer ends extended outward, and each outer end achieves two bulged display regions separated by the "black region" corresponding to the backbone electrode. As illustrated in FIG. 4, the outer ends of the conventional first backbone electrode 101 and second backbone electrode 102 all have "black regions" at their outer ends. The display effect shown in FIG. 8 indicates that the display quality at the outer ends of the backbone electrodes is obviously improved.

In the above embodiments, the edges of the outer ends of the backbone and spine electrodes are not aligned in that the edges of the backbone electrodes' outer ends are extended beyond the edges of those of the spine electrodes' outer ends. In contrast, the following embodiments achieve the non-alignment in different ways.

Figure 9:
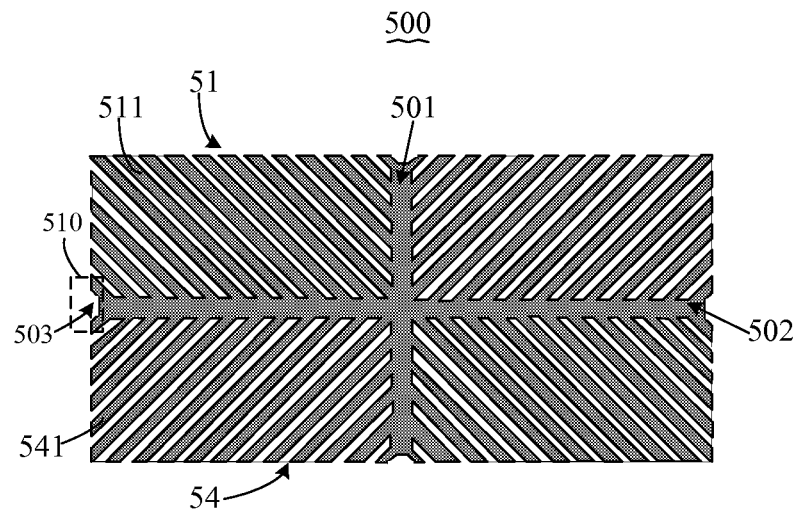
FIG. 9 is a schematic diagram showing a pixel electrode structure according to a fourth embodiment of the present invention.

FIG. 9 is a schematic diagram showing a pixel electrode structure 500 according to a fourth embodiment of the present invention. As illustrated, the pixel electrode structure 500 also has an asterisk-like pattern. The difference between the present embodiment and the pixel electrode structure 200 of FIG. 2 is that each outer end of the backbone electrodes is indented inward and the indentation has a trapezoid shape.

More specifically, using the second backbone electrode 502 as example, one of its outer ends 503's edge is indented inward relative to the vertical edges of the spine electrodes 511 and 541 to form a trapezoid-shaped indentation 510. One of the side edges of the trapezoid-shape indentation is parallel to the spine electrode 511 in the display region 51 whereas the other side edge is parallel to the spine electrode 541 in the display region 54.

Figure 10:
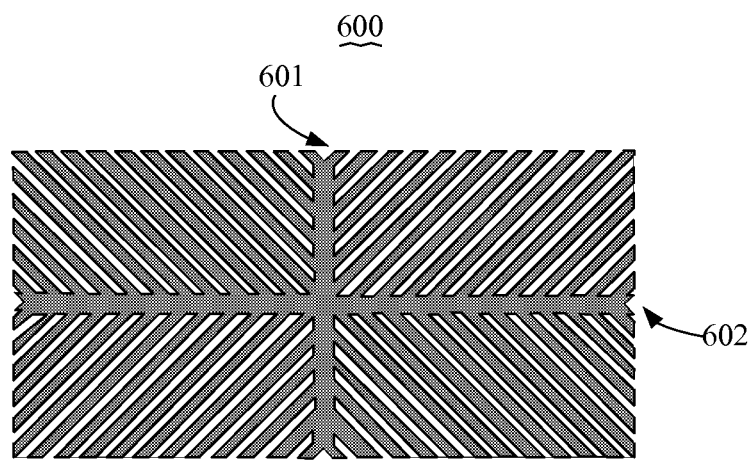
FIG. 10 is a schematic diagram showing a pixel electrode structure according to a fifth embodiment of the present invention.

In alternative embodiments, the indentation can have different shapes such as the triangle shown in FIG. 10. As illustrated, in a pixel electrode structure 600 of the present embodiment, the outer ends of the first and second backbone electrodes 601 and 602 are indented to form triangular indentations.

In yet some alternative embodiments, the edges of the outer ends of the backbone and spine electrodes are aligned but the outer ends of the backbone electrodes are thinner so as to achieve display quality improvement at the outer ends of the backbone electrodes.

In the above-mentioned embodiments, the structure of each outer end of the backbone electrodes can independently improve the display quality at the outer end. Therefore, it is possible that, in the same pixel electrode structure, the outer ends of the backbone electrodes can adopt different structures as described in the above embodiments.

The present invention also provides a LCD device whose pixel electrode is structured in accordance with any one of the embodiments as shown in FIGS. 2 to 10.

In summary, by having the edges of the backbone electrodes' outer ends not aligned with the edges of the spine electrodes' outer ends, the field pattern differences between those around the outer ends of the backbone electrodes and those of the spine electrode are reduced. The liquid crystal molecules at the outer ends of the backbone electrodes as such are oriented properly, thereby enhancing the display quality at the outer ends of the backbone electrodes.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A pixel electrode structure, comprising a linear first backbone electrode, a linear second backbone electrode, and a plurality of linear spine electrodes, jointly forming a rectangular shape, wherein the centers of the first and second backbone electrodes cross each other perpendicularly, thereby forming four display regions;

each display region is configured with a plurality of the spine electrodes at intervals;

the edges of the spine electrodes' outer ends in a same display region are aligned with the edges of the rectangular shape; and each of the backbone electrodes' outer ends extends across an edge of the rectangular shape, respectively.

2. The pixel electrode structure as claimed in claim 1, wherein at least an outer end of a backbone electrode has its overshoot section outside the rectangular shape formed into a trapezoid-shaped auxiliary electrode having two side edges connected to the backbone electrode; a first side edge is parallel to the spine electrodes in a same display region as the first side edge; and a second side edge is parallel to the spine electrodes in a same display region as the second side edge.

3. The pixel electrode structure as claimed in claim 1, wherein at least an outer end of a backbone electrode has its overshoot section outside the rectangular shape formed into a linear auxiliary electrode; and the auxiliary electrode is extended along the direction of the backbone electrode.

4. The pixel electrode structure as claimed in claim 3, wherein the width of the auxiliary electrode is identical to that of the backbone electrode.

5. The pixel electrode structure as claimed in claim 1, wherein at least an outer end of a backbone electrode has its overshoot section outside the rectangular shape formed into a pair of linear auxiliary electrodes; a first auxiliary electrode is parallel to the spine electrodes in a same display region as the first auxiliary electrode; and a second auxiliary electrode is parallel to the spine electrodes in a same display region as the second side edge.

6. A LCD device, comprising a pixel electrode structure having at least a linear first backbone electrode, a linear second backbone electrode, and a plurality of linear spine electrodes, jointly forming a rectangular shape, wherein the centers of the first and second backbone electrodes cross each other perpendicularly, thereby forming four display regions;

each display region is configured with a plurality of the spine electrodes at intervals;

the edges of the spine electrodes' outer ends in a same display region are aligned with the edges of the rectangular shape; and each of the backbone electrodes' outer ends extends across the center of an edge of the rectangular shape, respectively.

7. The LCD device as claimed in claim 6, wherein at least an outer end of a backbone electrode has its overshoot section outside the rectangular shape formed into a linear auxiliary electrode; and the auxiliary electrode is extended along the direction of the backbone electrode.

8. The LCD device as claimed in claim 7, wherein the width of the auxiliary electrode is identical to that of the backbone electrode.

9. The LCD device as claimed in claim 6, wherein at least an outer end of a backbone electrode has its overshoot section outside the rectangular shape formed into a pair of linear auxiliary electrodes; a first auxiliary electrode is parallel to the spine electrodes in a same display region as the first auxiliary electrode; and a second auxiliary electrode is parallel to the spine electrodes in a same display region as the second side edge.

10. The LCD device as claimed in claim 6, wherein at least an outer end of a backbone electrode has its overshoot section outside the rectangular shape formed into a trapezoid-shaped auxiliary electrode; the trapezoid-shaped auxiliary electrode has two side edges connected to the backbone electrode; a first side edge is parallel to the spine electrodes in a same display region as the first side edge; and a second side edge is parallel to the spine electrodes in a same display region as the second side edge.

* * * * *